(12) United States Patent
Zaman

(10) Patent No.: US 9,346,009 B2
(45) Date of Patent: May 24, 2016

(54) STRUCTURE OF AN ABSORPTION COLUMN

(75) Inventor: Dewan Shamsuz Zaman, Crawley (GB)

(73) Assignee: DOOSAN BABCOCK LIMITED, Sussex (GB)

( * ) Notice: Subject to any disclaimer, the term of this patent is extended or adjusted under 35 U.S.C. 154(b) by 81 days.

(21) Appl. No.: 13/989,562

(22) PCT Filed: Nov. 23, 2011

(86) PCT No.: PCT/GB2011/052300
§ 371 (c)(1),
(2), (4) Date: Aug. 8, 2013

(87) PCT Pub. No.: WO2012/069828
PCT Pub. Date: May 31, 2012

(65) Prior Publication Data
US 2013/0312608 A1    Nov. 28, 2013

(30) Foreign Application Priority Data
Nov. 24, 2010 (GB) .................................. 1019920.6

(51) Int. Cl.
*B01D 53/18* (2006.01)
*B01D 3/00* (2006.01)
*B01D 3/32* (2006.01)
*B01D 53/78* (2006.01)

(52) U.S. Cl.
CPC .............. *B01D 53/18* (2013.01); *B01D 3/008* (2013.01); *B01D 3/326* (2013.01); *B01D 3/328* (2013.01); *B01D 53/78* (2013.01);
(Continued)

(58) Field of Classification Search
CPC ................... B01D 2252/204; B01D 2257/504; B01D 2258/0283; B01D 3/008; B01D 3/326; B01D 3/328; B01D 53/18; B01D 53/78
See application file for complete search history.

(56) References Cited

U.S. PATENT DOCUMENTS

| 3,316,064 A * | 4/1967 | Kuzuoka et al. ............... 422/134 |
| 5,064,450 A | 11/1991 | Lankton et al. |
| 5,246,549 A * | 9/1993 | Heil .................................... 203/2 |

(Continued)

FOREIGN PATENT DOCUMENTS

| EP | 0 773 050 A1 | 5/1997 |
| GB | 931591 A * | 7/1963 | ............... B01J 19/32 |

OTHER PUBLICATIONS

UK Search Report dated Mar. 17, 2011 issued in corresponding UK Application No. GB1019920.6.
(Continued)

*Primary Examiner* — Duane Smith
*Assistant Examiner* — Cabrena Holecek
(74) *Attorney, Agent, or Firm* — Sughrue Mion, PLLC

(57) ABSTRACT

A column structure is described for the containment of high surface area packing and absorbent liquid reagent for the removal of a target gas from a gas stream. The column structure comprises at least one vessel having an elongate upright wall structure to define an absorption process volume for the containment of high surface area packing and for the countercurrent flow of absorbent liquid reagent and target gas in use; and a column perimeter structure comprising an elongate upright wall structure disposed around the at least one vessel in such manner that an inner wall of the elongate upright wall structure and an outer wall of a vessel cooperably define and fluidly enclose at least one secondary fluid volume fluidly isolated from the absorption process volume(s). A method of assembly of such a column and to a method of removal of a target gas from a gas phase using such a column are also described.

24 Claims, 9 Drawing Sheets

(52) U.S. Cl.
CPC .... *B01D 2252/204* (2013.01); *B01D 2257/504* (2013.01); *B01D 2258/0283* (2013.01); *Y02P 70/34* (2015.11)

(56) References Cited

U.S. PATENT DOCUMENTS

| | | | |
|---|---|---|---|
| 5,707,415 | A | 1/1998 | Cain |
| 2009/0249792 | A1* | 10/2009 | Guethe et al. .......... 60/773 |
| 2010/0096249 | A1 | 4/2010 | Kovak |

OTHER PUBLICATIONS

International Preliminary Report on Patentability dated Jun. 6, 2013 issued in corresponding PCT Application No. PCT/GB2011/052300.
International Search Report of PCT/GB2011/052300 dated Mar. 20, 2012.

* cited by examiner

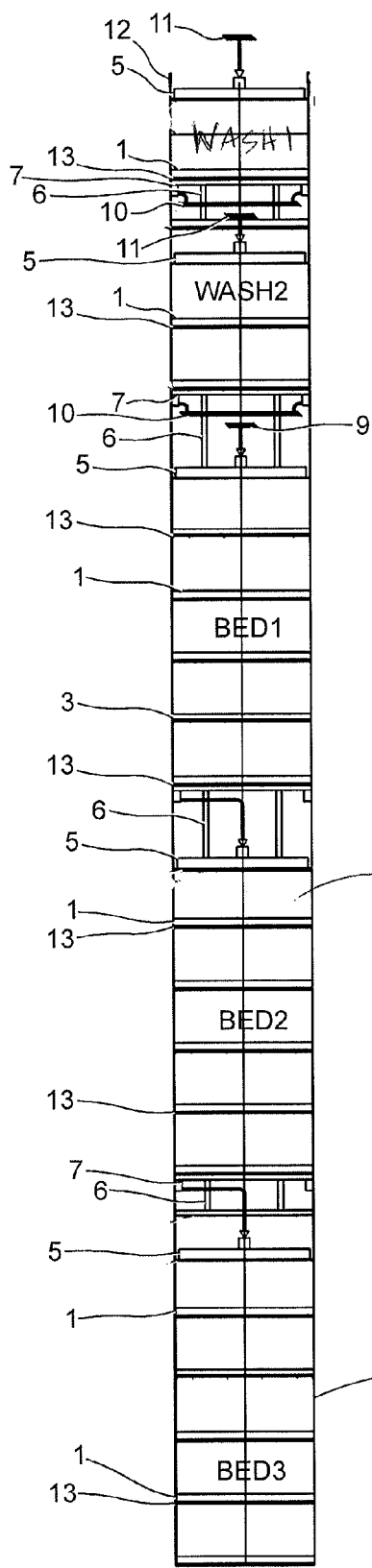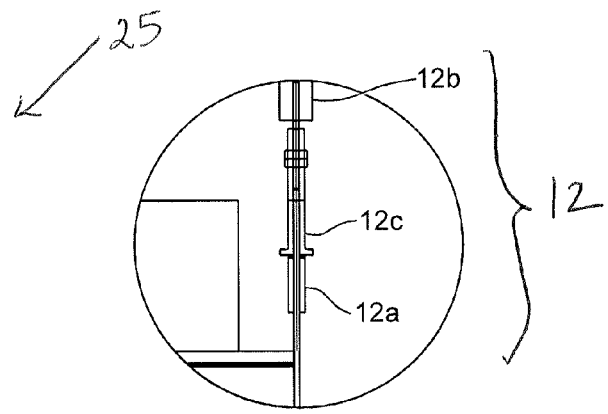
Fig. 2
Fig. 3

PLAN VIEW -
TYPICAL CROSS SECTION
OF INNER COLUMN TYPE 1a, 1b

PLAN VIEW -
TYPICAL CROSS SECTION
OF INNER COLUMN TYPE 2a, 2b

PLAN VIEW -
TYPICAL CROSS SECTION
OF INNER COLUMN TYPE 3a

PLAN VIEW -
FLOOR DETAILS
FOR TYPE 36 BASKET

Section J-J (K-K)

Section L-L (M-M)

Section N-N (P-P)

STRUCTURE OF AN ABSORPTION COLUMN

CROSS REFERENCE TO RELATED APPLICATIONS

This is a National Stage of International Application No. PCT/GB2011/052300 filed Nov. 23, 2011, claiming priority based on British Patent Application No. 1019920.6 filed Nov. 24, 2010, the contents of all of which are incorporated herein by reference in their entireties.

The invention relates to a column structure for an absorption column comprising a containment vessel and structured packing for use with an absorbent liquid reagent to effect the removal of a target gas from a gas phase. The invention relates in particular to a column structure for a packed tower absorber column for removing $CO_2$ from a gas phase by means of absorption. The invention is particularly suitable for use in removing $CO_2$ from the flue gases of thermal power plants fired by carbonaceous fossil fuels, both as new build and for retrofitting into existing thermal power plants. The invention also relates to a method of assembly of a column and to a method of removal of a target gas from a gas phase using such a column.

Most of the energy used in the world today is derived from the combustion of fossil fuels, such as coal, oil, and natural gas. Post-combustion carbon capture (PCCC) is a means of mitigating the effects of fossil fuel combustion emissions by capturing $CO_2$ from large sources of emission such as thermal power plants which use fossil fuel combustion as the power source. The $CO_2$ is not vented to atmosphere removed from flue gases by a suitable absorber and stored away from the atmosphere. Other industrial processes where similar principles might be applicable to capture post-process $CO_2$ might include removal of $CO_2$ generated in a process cycle, for example removal of $CO_2$ from the process flow during production of ammonia, removal of $CO_2$ from a natural gas supply etc.

It is known that $CO_2$ can be separated from a gas phase, for example being the flue gas of a thermal power plant, by means of absorption by passing the gas through a column where the gas flows in an opposite direction to an absorbent in liquid phase. Such a process is sometimes referred to as wet scrubbing. A well known absorbent reagent comprises one or more amines in water.

Packed tower absorber column technology is well established to exploit this. An absorption plant consists of at least one column where liquid absorber is run through the column as the gas that is to be scrubbed is passed in the other direction. The column is usually vertical and the gas introduced into the lower part of the column and fresh absorbent solution is introduced from the top of the column.

Typical columns consist of multiple sections of structured packing consisting of multiple thin plates or like structures to maximize the surface area for mass transfer. These are stacked within a containment vessel of steel or other suitable structural material. The primary loading consideration is that attributable to the weight of the column which is supported directly by the external walls of the vessel.

As used herein, the term absorption column means an elongate structure comprising an outer vessel wherein liquid and gas phases are countercurrently brought into contact to effect separation of a component of the gas phase into an actively absorbent component of the liquid phase.

The term column section is generally used to mean a zone within a column filling the column to its transverse extent, and being defined at the top or bottom by liquid and/or gas distributors respectively, and will typically comprise a support means for a section of packing.

The term packing refers generally to bodies of appropriate size, shape and configuration for fitment into the column to provide a high surface area volume density for the absorbent liquid to allow high mass transfer rates at the liquid-gas interface during countercurrent flow. Although random packing structures are known, where individual packing units and/or the surface elements thereof are not in a particular packing orientation, the invention particularly relates to structured packing, where individual units and the surface elements thereof have specific orientation relative to each other and, in the stacked state, relative to the columnar direction. Typical structured packings for absorbent columns for the absorption of flue gases such $CO_2$ are made of thin metal foil, expanded metal or woven wire screen stacked in layers. Polymeric material structures are also used in some cases. Thin steel foil structures are particularly preferred.

The gas volumes involved in post-combustion carbon capture at full scale from large thermal power plants burning carbonaceous fossil fuels are on a scale out of proportion with other industries. Full scale operation might require up to 20,000 t $CO_2$ or more to be captured per day (~1000 t/hr). This presents serious upscaling issues. Packed Bed absorber towers which are capable of absorbing 700 t $CO_2$ per hour or more will present challenges of scale, design, construction and operation. A single column for a 350 MW system based on existing packing and absorbing structures and a height of 60-80 m might be required to be 18 m diameter. A single column for an 800 MW system based on existing packing and absorbing structures might require to be 24 m diameter.

However, the scaling up of column designs presents new challenges. The loadings on the column increase. Shipping issues also arise. The cost of shipping anything above 6 m diameter is significant. However, a 6 m column is able to handle a maximum of about 100 tonnes $CO_2$ per day.

Current technology for the absorber internal packing design and the method of erection of a column with structured packing involves the production of blocks of structured packing which are then erected on site. Each block tends to occupy a volume of 0.17 m$^3$.

There are approximately 78, 500 such blocks of packing required for a column for an 800 MW system. Such volume requirements mean that the conventional method of packing may not be cost effective on the scale required for post-combustion $CO_2$ capture, where cost reduction is a significant driver.

There is thus considerable incentive to develop alternative designs and methods of column assembly and packing assembly that are practical on a large scale.

In particular, considerations arise because of the absorption process chemistry. The absorption process typically involves a harsh chemical environment within the active volume. Large column structures result in large mechanical loads. The concurrent requirements for materials that optimize mechanical strength and materials that optimize chemical resistance can produce complex composite structures and/or structures that are compromises between the two requirements.

SUMMARY

In accordance with the invention in a first aspect there is provided a column structure for the containment of high surface area packing and absorbent liquid reagent for the removal of a target gas from a gas stream comprising:

at least one vessel having an elongate upright wall structure to define and fluidly enclose an absorption process volume for the containment of high surface area packing and for the countercurrent flow of absorbent liquid reagent and target gas in use;

a column perimeter structure comprising an elongate upright wall structure having a continuous and closed perimeter disposed around the at least one vessel in such manner that an inner wall of the elongate upright wall structure and an outer wall of a vessel cooperably define and fluidly enclose at least one secondary fluid volume fluidly isolated from the absorption process volume(s).

The at least one vessel thus defines a fluidly enclosed absorption process volume for the countercurrent flow of absorbent liquid reagent and target gas in use in that an inner wall of the vessel fluidly encloses an absorption process volume. Plural vessel modules may be used to make up a modular vessel. The column perimeter structure surroundingly encloses the volume containing the at least one vessel and forms a continuous closed outer wall. The column perimeter structure thereby encloses at least one secondary gas volume. The secondary gas volume is defined at least within the space between an inner wall of the elongate upright wall structure and an outer wall of each at least one vessel. In the case of a plural modular vessel arrangement the secondary gas volume may additionally include spaces between outer walls of each vessel module.

The at least one secondary volume is arranged such as to be fluidly isolated from the at least one absorption process volume. For example, an absorption process volume may be provided with spaced inlet and outlet means (such as an inlet towards one end and an outlet towards another end) to effect in use the countercurrent flow of absorbent liquid reagent and target gas, and the at least one secondary volume may be sealingly isolated therefrom.

This arrangement confers a particular possible operational advantage in relation to the perimeter structure. The chemical atmosphere within each process volume is likely to be harsh. A vessel or vessel module requires appropriate material selection and structure to accommodate this harsh chemical environment. However, the perimeter structure is primarily intended to be a mechanical support structure. Defining one or more secondary fluid volumes in the way envisaged means that the perimeter support structure is exposed only to the fluid environment in that secondary volume. The fluid environment in the secondary volume need not be chemically harsh, as the secondary volume does not define an absorption volume. The secondary volume may be relatively inert. At least, the secondary volume need not be supplied with absorbent liquid reagent.

The process volume defined by a vessel or by the vessel modules as the case may be is thus kept fluidly separate from any secondary volume defined as part of the assembly but outside the process volume defined by each vessel or vessel module. Such a secondary volume for example comprises a space between the wall(s) of a vessel module and each adjacent module and/or a space between the wall(s) of a vessel or vessel module and the perimeter structure.

Such spaces are adapted to define one or more secondary fluid volumes fluidly distinct from the active primary absorption volume made up by the process volume(s) defined by the vessel(s). The spaces between adjacent walls of each vessel module, and/or the spaces between walls of a vessel or vessel module or vessel assembly and the perimeter structure, are fluidly isolated from the process volumes defined by the vessel(s) and form one or more such secondary fluid volumes. In a possible case, one or more such secondary fluid volumes are defined at least by the outer wall surface(s) of the wall(s) of the vessel(s) or vessel modules which form the perimeter of the vessel structure and the inner wall surface(s) of the perimeter structure itself. In such a case, the perimeter structure preferably forms in combination with the outer wall surface(s) of the wall(s) of the vessel(s) a continuous elongate enclosure, and is at least to the extent necessary to do this a continuous and fluidly closed wall structure.

The assembled column may further comprise fluid seals appropriately located in the spaces between the said walls to fluidly separate the process volume(s) from the secondary volume(s).

Thus a vessel or an assembly of vessels is and/or vessel modules are so arranged that the primary absorption volume is fluidly separate from one or more secondary fluid volumes. Means are preferably provided to supply absorbent liquid reagent only to the active primary absorption volume, to supply gas to be processed to the process volumes to flow counter-currently with the absorbent liquid reagent, and to supply gas to the secondary volumes to create a relatively less chemically reactive atmosphere, in particular being an atmosphere with at least much reduced levels of absorbent liquid reagent. The gas so supplied may simply be dry gas to be processed (ie the gas for processing without absorbent liquid reagent present), or may be another relatively inert gas. The supply means may be adapted to supply the gas to the secondary volume before supply of the liquid reagent to the primary active volume and/or at a slight over-pressure to prevent leakage of wet gas (that is, gas carrying absorbent liquid reagent) from the primary active volume. A particular advantage of this arrangement is that it entirely isolates the perimeter structure from the harsh environment within the active volume. The perimeter structure can be optimized for its mechanical support role, and need not be provided with chemical resistance. The wall(s) of the vessel(s) defining process volume(s) making up the active primary volume are optimized for chemical resistance, but need not have a major structural role.

The column perimeter structure describes an outer perimeter for the column volume, which surrounds the column volume in closed manner, for example defining a perimeter comprising a closed simple polygon or closed simple curve, in which one or more vessels are disposed. The process volume(s) within the vessel(s) collectively comprise a primary active absorption volume for the containment of high surface area packing and for the countercurrent flow of absorbent liquid reagent and target gas in use. The column perimeter structure comprises a secondary wall structure surrounding the active volume and defining a secondary volume.

Thus, the column defines a tower suitable for use as a packed tower for a wet scrubbing process of a gas phase in familiar manner. It is distinctly characterised by the provision of a column perimeter structure comprising a secondary wall structure surrounding the process vessel(s) provided for the wet scrubbing process but structurally discrete and fluidly isolated from the vessel wall(s) of the process vessel(s). This allows the column perimeter structure to be fabricated with its structural role in mind, without concerns over the harsh fluid environment of the process volume(s).

The column perimeter structure may be similarly shaped to the perimeter surface of the active volume process defined by the process vessel(s) and concentrically disposed with respect to the active volume but this is not a necessary condition.

Each vessel defines a process volume for the containment of high surface area packing and absorbent liquid reagent for the removal of the target gas from the gas stream. However, the perimeter structure contributes to the overall structural integrity of the column, and in particular in a preferred case carries a substantial part of the structural load of the column structure, and more preferably most of the load of the column structure. That is, in the preferred case the at least one vessel and the elongate upright wall structure are mechanically arranged in such assembled manner that a major part of the load of the assembled column structure is carried by the column perimeter structure.

As has been noted, an advantage of such an arrangement is that the vessel walls making up the active volume and the walls of the perimeter structure may focus on different principal roles for which they are respectively optimized. The vessel walls of the active volume define a reaction volume for the absorption process. The absorption process typically involves a harsh chemical environment within the active volume. Large column structures result in large mechanical loads. In the above described arrangement, the outer perimeter structure is not necessarily exposed to such a harsh environment, which is contained entirely within the walls of the vessel(s) making up the active volume. Accordingly, it need not be optimized for chemical resistance, and can instead be optimized for mechanical strength. Conversely, if the column structure is adapted such that the perimeter wall structure is the substantial primary load bearing structure, and in particular is adapted in such manner as to carry the weight of the vessel(s) within it and/or the structured packing within the vessel(s), the mechanical strength requirements for the vessel walls can be reduced and they can instead be optimized for chemical resistance.

The perimeter wall structure may additionally comprise a roof closure or partial closure. The roof closure or partial closure and/or additional means disposed and supported within a roof volume it defines may be adapted to contribute to a column load bearing capacity of the perimeter wall structure.

The perimeter wall structure defines a secondary fluid enclosure volume at least in part in conjunction with the outer wall(s) of the vessel(s) that it surrounds. Optionally, any vessel wall adapted in use to sit adjacent to an inner wall of the perimeter structure is arranged to extend substantially parallel to the adjacent portion of the inner wall of the perimeter structure.

The invention is applicable to a column design in which a plurality of column sections each comprising a separate packing layer is provided in succession vertically. Preferably in such case, a plurality of column sections comprising each separate packing layer is provided in accordance with the foregoing.

In a possible embodiment the column structure comprises a plurality of vessel column modules each having an elongate upright wall structure, the column modules being adapted to be disposed together alongside one another in two dimensional array to constitute collectively a columnar vessel assembly.

In a possible embodiment each column module may comprise a plurality of vertically disposed sub-modules. This is intended to facilitate pre-fabrication and assembly in situ, in particular to facilitate assembly with a loading arrangement whereby at least a substantial part of the structural load of the column structure is carried from the top via the upper column support structure.

A sub-module may comprise a basket. A basket in this context comprises a support structure for a discrete portion of high surface area packing material. A basket comprises at least a horizontal support surface adapted to carry a discrete portion of high surface area packing material. A basket optionally comprises additional wall structures.

A vessel or vessel module has an elongate upright wall structure defining a perimeter that surrounds a process volume within the vessel, said perimeter for example comprising a closed structure such as a closed simple polygon or closed simple curve or combination. That is, the elongate upright wall structure may comprise a plurality of planar walls defining straight edges of a polygonal perimeter or part thereof and/or one or more curved walls defining arcuate edge(s) of a curved perimeter. The walls extend in elongate manner such that a vessel or vessel module may have a (partly) prismatic and/or (partly) cylindrical structure.

Where plural vessel modules are used these are typically arranged in two dimensional array to extend generally vertically in generally parallel manner. The vessel modules thus collectively comprise a columnar vessel assembly. Although the modules may define fluidly separate process volumes for the containment of high surface area packing and for the countercurrent flow of absorbent liquid reagent and target gas, the module volumes collectively comprise an active absorption volume and the modules at least to that extent collectively comprise a single column structure. The active absorption volume collectively so defined is used for the removal of a target gas from a gas stream by means of an absorbent liquid reagent, and the packing layer provides a high surface area for mass transport.

Preferably, plural vessel modules are arranged in such manner that adjacent vessel walls of adjacent vessel modules extend substantially parallel to one another when the vessel modules are located in position. Adjacent vessel walls of adjacent vessel modules may abut or may be spaced apart. Spaces between adjacent vessel walls of adjacent vessel modules may form part of a secondary volume as above defined. Conveniently, the vessel walls are generally evenly spaced when the vessel modules are located in position.

Conveniently, plural vessel modules are located in a regular array extending in two dimensions, for example, a square, rectangular or hexagonal array, for example essentially in tessellating manner.

The module volumes of the modules making up a vessel assembly collectively comprise an active volume for the containment of high surface area packing and absorbent liquid reagent and in which the absorption process takes place. The walls or parts thereof of each vessel module lying on the periphery of the vessel assembly define a perimeter surface and perimeter shape of the vessel assembly and of the active volume and therefore comprise one or more perimeter walls or parts thereof of such a perimeter surface of the active volume. Such walls are suitably shaped with this purpose in mind.

In a convenient arrangement of modular vessel assembly a polygonal shape is preferred for at least some vessel modules. That is, such a vessel module comprises an elongate prismatic vessel having plural planar generally vertical walls together defining a closed simple polygonal perimeter.

In a preferred case of modular vessel assembly, all vessel module walls that are internal to the vessel assembly when assembled, that is all walls of a vessel module adapted to sit adjacent to the wall of another vessel module, are planar.

Optionally, perimeter walls forming in a vessel assembly of plural vessel modules a part of the perimeter of the vessel assembly, and where applicable thus seating adjacent to an inner wall of the perimeter structure, may be of different shape, for example curved, to define a curved perimeter to the vessel assembly and/or to sit complementarily with a curved inner wall of a perimeter structure.

In a convenient embodiment of modular vessel assembly, all vessel modules adapted to sit entirely internally in a vessel assembly, which is to say having no wall making up any part of the perimeter of the vessel assembly when assembled, have a square or rectangular perimeter shape. Conveniently, all entirely internal vessel modules are of identical shape and size. Vessel modules which sit peripherally in the vessel assembly such that at least one wall or part thereof of such a vessel module forms a part of the perimeter of the vessel assembly may be irregular polygons or have one or more curved walls to accommodate a particular desired perimeter shape. However, it is desirable for ease of assembly that the number of different shapes of vessel module is minimized.

Preferably the perimeter structure comprises a vessel having an elongate upright wall structure for example defining a perimeter comprising a closed simple polygon or closed simple curve.

Preferably the perimeter structure comprises a primary load bearing structure by means of which the load attributable to the weight of vessel and/or columnar and/or packing structures is transmitted to the ground.

For example the perimeter structure includes or mechanically supports a column top support structure located in the vicinity of the upper part of a column structure so assembled; and a vessel and where applicable each column module is mechanically supported from the column top support structure.

Additionally or alternatively for example, one or more transverse platform supports may be provided extending within the walls of a vessel to provide a support structure for a high surface area packing material. In a preferred case the perimeter structure is adapted to provide a load bearing structure by means of which the load attributable to the weight of the platform and packing structures thereon is transmitted to the ground.

In a possible embodiment of load bearing structure a column perimeter structure is provided with:

a top support structure extending inwardly from the perimeter of a vessel towards the top thereof; and slung tensile members attached to the top support structure and extending downwardly to support at least one internal column structure.

Such an internal column structure may include a transverse platform support structure for a high surface area packing material, a vessel or a vessel module. Thus, the perimeter structure carries at least in part the load for a support structure for a high surface area packing material and/or a vessel and/or a vessel module via the slung tensile members and through the top support structure into the perimeter wall(s).

The top support structure may be integral with a roof closure or partial closure of a perimeter structure, for example integral with a roof closure or partial closure defining a wall structure sloping in tapered manner upwardly towards the centre (for example comprising an optionally frusticated dome, ogive or pyramid). Additionally or alternatively the top support structure may be separately provided as a bespoke support structure towards the top of the column for example in the vicinity of and for example just below a vessel roof.

The provision of a support structure to carry load for example in accordance with the above described preferred embodiment means that at least some of the load that might otherwise be carried by the walls of the vessel modules defining the active volume is carried instead as a tensile load in the tensile slung members and then through the top support structure, and into the column perimeter wall structure as a vertical compressive load. In addition to this arrangement allowing the load bearing capability of the overall structure to be concentrated in the perimeter wall(s) and allowing the construction, all other things being equal, of potentially larger columns, it also offers further flexibility as regards loading conditions. For example, a static pre-load may be applied to the overall structure. For example, a pre-stressing load may be applied prior to or subsequent to the inclusion of packing material. For example, the sling members may be pre-tensioned.

In a possible embodiment, a column may be divided into plural flow zones.

This offers the possibility that the different vertical zones so defined by the modules may be used in different ways for different flow requirements. For example at a time of reduced flow only some of the modules might be used.

A further possible advantage of a modular structure follows from the fact that a column is readily divided into plural flow zones which are fluidly separate in that separate modules or groups of modules are adapted to serve in use as separate flow zones.

Additionally or alternatively for the same reason, a non-modular vessel may be subdivided or a vessel column module may be further subdivided by internal partition walls. Partition wall structures may be provided extending vertically along at least a part of the length of a vessel, and preferably the entire active length of the vessel, to partition the column where they so extend into at least two zones which are fluidly separate. For example a non-modular vessel may be subdivided into inner and outer flow zones by a closed vertically extending internal wall. The outer internal zone so defined may be further subdivided by further, radial, wall structures.

The vessel/vessel modules when assembled as the case may be define a perimeter shape for the active column volume which is conveniently a closed simple curve such as a circle or an ellipse (that is, in such a case when vertical the column is a right cylinder) or, a closed simple polygon (that is, in such a case when vertical the column is a right prism). The perimeter structure defines a perimeter shape of the column which may be of a similar shape to that of the perimeter shape of the active column volume about which it extends or not.

References hereinbelow to a preferred column perimeter shape may therefore be read either as references to a preferred perimeter shape of the active volume made up of the vessel/vessel modules when assembled as the case may be or as references to the preferred perimeter shape of the perimeter structure.

In a particular embodiment a polygonal shape is preferred. Thus, in accordance with the embodiment a column structure for the containment of high surface-area packing and absorbent liquid reagent for the removal of a target gas from a gas stream comprises an elongate prismatic structure having plural planar generally vertical perimeter walls together defining a closed simple polygonal perimeter. Although the shape may be square or rectangular, it is preferably one that approximates more closely to circular, and is for example one wherein the internal angle between each wall making up the polygonal perimeter is at least 120° and less than 180°.

The distinct shape of the particular embodiment combines some of the advantages of both principal prior art shapes, cylindrical and rectangular.

It approximates more closely to a cylindrical structure than a rectangular column or vessel does. Thus, a polygonal prismatic columnar structure in accordance with the preferred embodiment retains more of the inherent stiffness advantages of a cylindrical column, by its more close structural approximation to a cylindrical column, than is the case with a rectangular vessel. In particular, the stiffness for a unit area is better than that for a rectangular column, with consequent advantages for the stability of the structure when packed, and for the stability of platform supports for the packing material.

The potential is offered for a greater structural size (that is, a greater surface area, and hence a greater volume per unit height) for an otherwise common range of structural parameters than would be the case with a rectangular structure.

However, some of the practical drawbacks of the cylindrical column are reduced or eliminated. Individual vessel sections may be fabricated as and chipped as flat sheet structures. The sections themselves do not need to have a curved structure. In a preferred case of modular vessel assembly, no module has a curved wall. Thus, the practical constraints in this regard with respect to fabrication and shipping which have tended to limit the practical sizes of cylindrical, vessels to about 6 m have been reduced. The design and installation of sealing edges necessary for tray operation may also be simplified.

A column/vessel structured in accordance with the shape of the particular embodiment obviates some of the disadvantages of both prior art designs, cylindrical and rectangular, which tend to impose vessel size constraints for a column/containment vessel. Moreover, the polygonal shape works particularly well in conjunction with the tensile slung arrangement of the preferred embodiment above described.

In accordance with the preferred embodiment, the column is polygonal in cross section with parallel walls defining a closed simple polygonal perimeter. The preferred shape is determined by structural considerations, and for example by a desire to approximate more closely to a cylindrical column. For example, the polygonal structure preferably comprises a cyclic polygon (that is, the vertices define a circumscribed circle), and is preferably a regular polygon (that is, equiangular and equilateral). An even number of sides is likely to be preferred, and in particular a polygon which provides paired opposite parallel sides.

Although the column has planar sides, the internal angles at the vertices of the polygon defined by each side are preferably at least 120°, and consequently the vessel has at least six sides. The total number of sides is likely to be a compromise between a minimum number below which a reasonable approximation to cylindrical structure is lost and a maximum number which reflects a desire to minimize complexity of assembly. A vessel with 12 to 20 sides will typically be preferred for most applications.

Prior art vessels have typically been provided with a dished or domed wall and/or base to complete the closure. The top and/or base of the present column may comprise a partly pyramidal structure. In particular, the top and/or base may comprise a planar wall structure in which wall sections making up the top and/or base extend from the respective perimeter walls of the column. Again, such structures are easier to manufacture, for example on a modular basis, and to transport for assembly in situ.

The column of the present invention is adapted for vertical operation, and for example adapted for the liquid to flow downwards from an inlet near the top and for the gas to be circulated counterwise upwards from an inlet near the bottom.

It is a particular advantage of the present invention that larger sized column structures, and in particular column structures with a larger transverse extent and thus a larger volume per unit height, can be constructed more easily. In the preferred case, the vessel is so structured as to have a minimum dimension in a transverse direction which is at least 10 m and more preferably at least 15 m to 30 m or more.

As discussed above, the throughput rates required for large thermal power plants would suggest a requirement for cylindrical column structures with a diameter of 18 m to 24 m or more. A column structure in accordance with the present invention preferably has comparable transverse dimensions. In the case where the column structure comprises a cyclic polygon such as a regular polygon, it can be defined by a circumscribed circle having such a diameter.

This can be contrasted with present vessels, where structural, fabrication and transport considerations applicable to conventional practical materials such as structural steel have been held to limit the practical dimensions of a cylindrical vessel to a diameter of around 6 m, and to limit the practical shortest direction of a rectangular vessel to a similar 6 m.

The envisaged use of a column structure in accordance with the invention is as a packed tower comprising high surface area packing material and absorbent liquid reagent for the removal of a target gas from a gas stream. In a more complete embodiment of the invention there is provided such a packed tower absorber column comprising a column structure as above described with packing material in situ.

In a particular preferred case the column structure comprises a plurality of support platform structures carrying packing material in a plurality of column sections, including at least one and preferably a plurality of absorbent liquid reagent stages and at least one washing stage.

Preferably, the packing material is a structured packing material. The structured packing material provides a high surface area structure to provide a high gas/liquid contact area per unit volume for high mass transfer, and may be of suitable familiar form, in particular providing plural arrays of thin corrugated metal sheet. The precise nature of the packing material is not pertinent to the invention, which is intended to be used with known packing materials and known absorbent chemistries, but which will also support new packing materials and chemistries as they are developed.

In a more complete embodiment, the internal volume of the column preferably further comprises, typically for example disposed at the top of each structured packing section, one or more of a collector structures, a distributor structure, and a bed limiter in familiar manner. The column may further comprise in a washing stage a demister structure. All the foregoing will be of familiar design scaled up as applicable to the larger columns made possible in the present invention.

The column preferably further comprises a means to supply absorbent solution through one or more inlets in the vicinity of the top of the column.

In the preferred case the modular structure defines a plurality of fluidly distinct process volumes in two dimensional array about the area of the column. A means to supply absorbent solution to and through one or more inlets in the vicinity of the top of the column preferably comprises a means to distribute solution between each process volume. In a possible embodiment, plural supply pipes extend across the top of the process volumes. Each supply pipe may supply a plurality of process volumes for examples arranged in a row. Such a supply pipe may correspondingly have a plurality of supply apertures. Plural supply pipes may be supplied with absorbent liquid reagent from a common supply manifold, for example located at or about a part of the perimeter of the column.

The column preferably further comprises a means to supply gas to be treated through one or more inlets in the vicinity of the base of the column.

In the preferred case to accommodate a modular structure defining plural process volumes the column, the means to supply a gas to be treated to one or more inlets in the vicinity of the base of the column similarly comprises a means to distribute the gas to be treated between the plural process volumes.

As above described, the column structure defines one or more secondary fluid volumes which are fluidly isolated from the process volumes, for example in that the outer wall surfaces of the vessel structure or assembly and the inner wall surfaces of the perimeter structure together define one or more secondary fluid volumes which are fluidly isolated from the process volumes. The column preferably further comprises a means to supply gas to the secondary volume in a manner which maintains in a secondary volume a relatively inert atmosphere, in particular an atmosphere which does not comprise absorbent liquid reagent. The gas supplied to the secondary volume may be a secondary gas, or may be a dry supply of the gas to be treated.

In the preferred application the column is a $CO_2$ wet scrubber, and the solution may comprise one or more aqueous amines, for example including but not limited to monoethanolamines or methyl-diethanol-amines.

In the preferred application a column is provided for use in a scrubber column for flue gases and is provided with a flue inlet towards the bottom of the column.

In accordance with the invention in a further aspect a method of assembly of a column structure for the containment of high surface area packing and absorbent liquid reagent for the removal of a target gas from a gas stream comprises the steps of providing one or more vessels having an elongate upright wall structure to define and fluidly enclose an absorption process volume for the containment of high surface area packing and for the countercurrent flow of absorbent liquid reagent and target gas in use;

providing a column perimeter structure comprising an elongate upright wall structure;

surroundingly enclosing the vessel(s) within the column perimeter structure, in such assembled manner that an inner wall of the elongate upright wall structure and an outer wall of a vessel cooperably define and fluidly enclose at least one secondary fluid volume fluidly isolated from the absorption process volume(s) and preferably in such assembled manner that a major part of the load of the assembled column structure is carried by the column perimeter structure.

In a possible embodiment the method comprises providing a plurality of vessel column modules each having an elongate upright wall structure, and arranging the vessel modules together alongside one another in two dimensional array within the column perimeter structure.

In a possible embodiment each column module comprises plural sub-modules and the method comprises:

assembling multiple such pluralities of sub-modules together in elongate array to form multiple elongate vessel column modules;

arranging the vessel column modules vertically together alongside one another in two dimensional array to constitute collectively said column structure such that the vessel modules collectively comprise a columnar vessel assembly as above.

Particularly preferably, each column module is assembled by the assembly of each of its plurality of constituent sub-modules successively from the top downwards.

In a possible embodiment the method comprises:
providing a column top support structure;
supporting each vessel/column module mechanically in the vicinity of the upper part of a column structure so assembled via the top support structure.

The module volumes collectively comprise an active absorption volume and the active volume collectively so defined is used for the removal of a target gas from a gas stream by means of an absorbent liquid reagent, and the packing layer provides a high surface area for mass transport.

The vessel(s) or vessel modules are arranged with the column perimeter structure in such assembled manner that an inner wall of the elongate upright wall structure and an outer wall of a vessel cooperably define and fluidly enclose at least one secondary fluid volume fluidly isolated from the absorption process volume(s) defined by the inner wall(s) of the vessel(s) or vessel modules. Preferably, the vessel(s) or vessel modules are disposed within the volume defined by the column perimeter structure in such a manner that the process volume(s) within each vessel or vessel module are kept fluidly separate from the one or more secondary volumes defined within the volume defined by the column perimeter structure but outside the process volume defined by the vessel(s). For example the vessel(s) or vessel modules are assembled such that a secondary volume comprises a space between the wall(s) of a vessel module and each adjacent module and/or a space between the wall(s) of a vessel or vessel module and the wall(s) of the perimeter structure. The assembly method may further comprise providing fluid seals appropriately located in the spaces between the said walls to fluidly separate the process volume(s) from the secondary volume(s).

Preferably, the vessel(s) or vessel column modules are assembled to be supported by the column perimeter structure, for example via a support structure in an upper part thereof.

Preferably the column perimeter structure is provided with:
a top support structure extending inwardly from the perimeter of a vessel towards the top thereof; and
slung tensile members attached to the top support structure; and an internal column structure, for example selected from a transverse platform support structure for a high surface area packing material, a vessel or a vessel module, is assembled to be supported by the slung tensile members.

For example at least the vessel(s) or vessel modules are assembled to be supported by the slung tensile members.

The method of this aspect is in particular a method of assembly of a column in accordance with the first aspect of the invention. Other preferred features of the method will be understood by analogy.

In accordance with the invention in a further aspect a method of processing of a gas phase to effect separation of a component of the gas phase by absorption into a liquid phase comprises:

providing a column in accordance with the first aspect of the invention or assembled in accordance with the second aspect of the invention, in particular preferably packed with high surface area material packing such as structured packing;
causing the gas phase to flow through the column;
causing a liquid phase comprising an absorbent reagent to flow countercurrently through the column.

As a result, the liquid and gas phases are countercurrently brought into contact to cause the target component of the gas phase to be absorbed into the liquid phase in familiar manner.

Preferably the column is disposed generally vertically, the gas phase is introduced towards the lower part of the column and caused to flow upwardly, and the liquid phase is introduced towards the lower part of the column and caused to flow downwardly.

In a preferred refinement of the method, the liquid phase and gas phase to be processed are introduced to the active absorption volume, and a relatively less reactive atmosphere is maintained within the column outside the active absorption volume for example at least in that it is not exposed to the liquid phase. In particular this is done in that the vessel(s)

making up an active absorption volume are arranged such that the column outside the active absorption volume defines a secondary volume that is kept fluidly isolated from the active absorption volume and into which liquid phase is not introduced. The process gas phase without the liquid phase or another relatively inert gas phase may be introduced to the secondary volume, for example prior to introduction of the liquid phase to the process volume and/or at a degree of overpressure to limit leakage of liquid phase into the secondary volume and so to tend to maintain a relatively less chemically reactive atmosphere therein.

In a convenient case, the column comprises a perimeter structure and the secondary volume comprises the column volume within the perimeter structure but outside the primary absorption volume. The method in this case comprises introducing the liquid phase and gas phase to be processed to the primary absorption volume and introducing the process gas phase without the liquid phase or another relatively inert gas phase to the secondary volume.

In the preferred case, the column comprises a plurality of vessel column modules each defining a process volume, the modules being so assembled as to together comprise the primary active volume, and the secondary volume comprises the column volume outside the process volumes together comprising the primary active volume that is kept fluidly isolated therefrom. The method in this case comprises introducing the liquid phase and gas phase to be processed to the process volumes of the several modules, and maintaining a relatively less chemically reactive atmosphere in the secondary volume, at least in that the secondary volume is kept fluidly isolated from the active absorption volume and liquid phase is not introduced into it.

The method is in particular a method of operation of a column in accordance with the first aspect of the invention. Other preferred features of the method will thus be understood by analogy.

BRIEF DESCRIPTION OF THE DRAWINGS

The invention will now be described by way of example only with reference to FIGS. 1 to 6 of the accompanying drawings, wherein:

FIG. 2 is a longitudinal cross section through a vessel module making up the column structure of FIG. 1;

FIG. 3 illustrates in enlarged view a slung tensile member of the embodiment of FIG. 2;

FIG. 4 illustrates in plan view a possible suspension structure;

DETAILED DESCRIPTION

Figure 1:
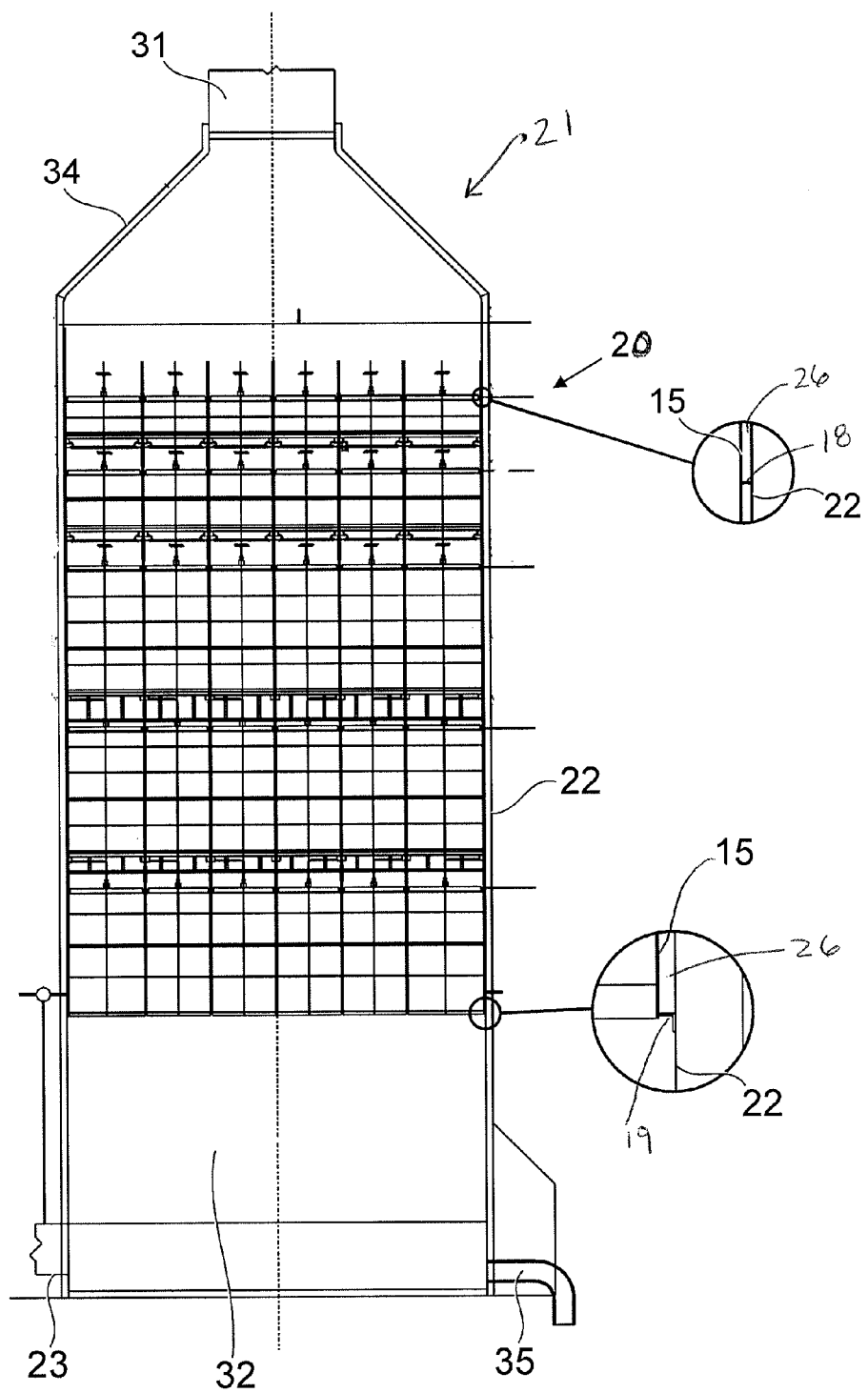
FIG. 1 is a longitudinal cross section through a column structure embodying the principles of the invention.

FIG. 1 illustrates a vertically oriented column to serve as a flue gas scrubber or absorber for post-combustion capture of $CO_2$ from the flue gas of a thermal power plant using a carbonaceous fuel source. The column of FIG. 1 embodies the structural principles of the present invention as illustrated in more detail in the other figures.

The absorber column shown as an embodiment of the invention is based on a 24.7 m circular column absorber as might be required for single stream post-combustion $CO_2$ capture from an 800 MW plant.

A column structure 21 comprises an outer containment vessel 20 (a column perimeter structure or an outer column) having a vertical perimeter wall structure 22, which may have a cylindrical shape. The outer containment vessel 20 defines a gas inlet 23 which in the example is an inlet for flue gases (which may be direct or partly pre-processed) from a thermal power plant, and a gas outlet 31 which will vent flue gases to atmosphere or pass for further processing having been scrubbed. The flue gases circulate from bottom to top, and absorbent solution is introduced towards the top of the column to circulate in the counterwise direction in familiar manner.

The reactive volumes 27 (absorbent process volumes or primary volumes) within internal columns 25 (vessel modules) are fluidly isolated from secondary volume(s) 26 defined outside the internal columns 25 but within the vertical perimeter wall 22 of the outer containment vessel 20. The insets in FIG. 1 illustrates how this is done by provision of a seal. The upper inset shows detail of a seal plate 18 at the top end of the internal columns. The lower inset shows detail of a protective angle seal 19 at the bottom of the internal columns. With these seals in place any flue gas leakage from the secondary volume will be through the gap between protective angle and the column or through any other leakage due to construction faults of internal walls and the negative pressure within the column. Therefore the outer column is protected from the reactive fluids in the internal columns.

Figure 5:
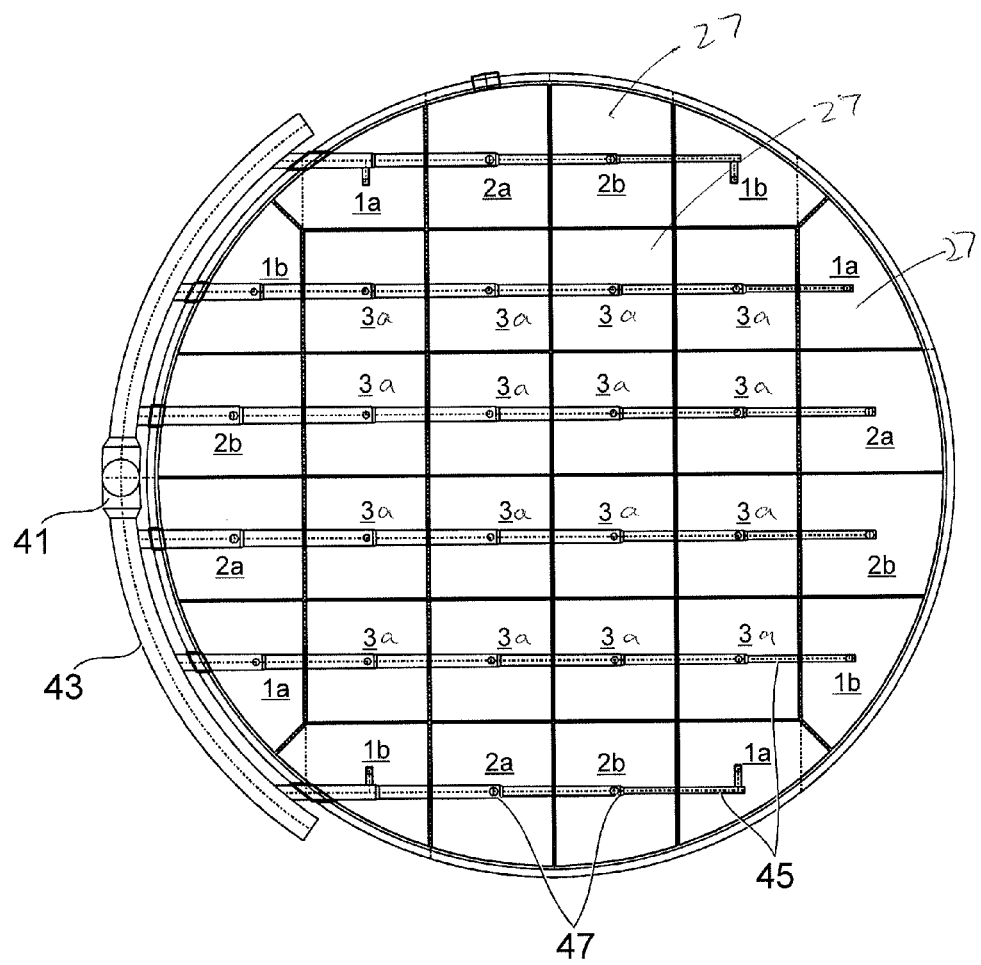
FIG. 5 illustrates in top plan view an example arrangement of modules and an example system for the distribution of solution into each module.

For modularization purposes the column is in the example embodiment subdivided into 32 internal packed vertically extending column modules, as can be seen in more detail in FIG. 5. In the representation in FIG. 1 six such vessel modules 25 can be seen in cross section across the column 21. It is within the process volumes 27 defined by the vessel modules that the solution is introduced towards the top of the column 21 to circulate in the counterwise direction to the flue gas, and it is within the process volumes 27 defined by the vessel modules 25 that absorption takes place.

An example vessel module 25 is shown in longitudinal cross section in FIG. 2. The vessel module 25 has a vessel module wall 15, formed in this case in a polygonal shape, containing structured packing to provide the necessary surface area for contact between absorbent solution introduced from the top and flue gases circulating upwards. In the embodiment, plural column zones comprising separate sections of structured packing are shown, being successive structured packing layers, and additionally two wash sections of structured packing layers at the top. Such multiple stages and structures will be generally familiar to the person skilled in the art from generally equivalent structures found in prior art single vessel columns.

The vessel module walls 15 define the reactive process volume 27 in which absorption takes place and need to resist the harsh environment attributable to the absorbent liquid. However, in the illustrated embodiment, most of the load is carried by the vertical perimeter wall structure 22. The design and material selection for the vessel modules keeps this in mind. Suitable materials for the vessel module walls 15 include: stainless steel, for example grade 316, 3 mm thick;

and reinforced plastic, for example Fortron 1140L4, 10 mm thick. The embodiment in FIG. 2 is an example of the latter.

Structured packing is carried on support grids 1, 3. All support grids are supported by continuous angle 13. A support grid is constructed using flat plates. Wall restraints are provided.

The structured packing is divided into three main vertical sections for absorption and two wash sections above, each provided with a liquid distributor or redistributor 5 at the top of the section and a liquid collector 7 at the bottom in generally familiar manner. These may be fixed in position and sealed prior to installation of the packing. In the figure these are shown spaced apart by the temporary framework elements 6. These can be wooden and removed after site welding.

For further modularization purposes each vertically extending column module is further divided into plural successively vertically arrayed sub-modules.

In the embodiment each sub-module may comprise a basket defining a containment means for a discrete portion of high surface area packing and carrying the same in the assembled column. Basket alignment plates are provided up the column. There are nine baskets in each packed module. These baskets are designed to be packed and fabricated in manufacturing bays from the top down progressively with the other equipment shown in FIG. 2. The purpose of this is to minimize construction time on site.

The height of a basket is determined based on the feasibility of transportation and may be around 4500 mm. However, the height will be influenced also by the dimensions of other equipment in the module and by the location of suitable site welds.

The width, length and shape of a basket are determined based on its location, and on the dimensions and shape of the module in which it locates and of its position therein in particular. Again, typically each of these dimensions may be limited to a maximum of around 4500 mm.

The operational process is familiar. A suitable absorbent liquid such as, in a familiar chemistry, amine dissolved in water, is used. This is supplied by the supply pipes 9 to the process volume of each vessel module. The gas to be scrubbed, in the embodiment flue gas from a thermal power plant, is introduced into the lower part of the column via the gas inlet 23 and fresh absorbent solution is introduced from towards the top of the column into each vessel module. The absorbent liquid runs down through the structured packing as the $CO_2$ rich flue gas passes up through it.

$CO_2$ in the flue gas will be absorbed by the amine solution by formation of weak chemical bonds. Thus, as is familiar, the amine solution is enriched with $CO_2$ as it travels down the column and $CO_2$ is removed from the flue gas as it travels up the column 21.

The gas continues into the washing stages where it is washed by a washing liquid circulated via the supply pipes 11 and return pipes 10. When the flue gas reaches the top of the column 21 it is vented to the atmosphere or passed for further processing via the gas outlet 31, at which point a large proportion of the $CO_2$ has been removed.

$CO_2$ enriched amine solution passes through into the lower volume 32 to be discharged via outlet 35. The solution is passed on to suitable apparatus for recovery of the $CO_2$. Typically this process involves regenerative heating of the amine solution. At higher temperatures the solution will release the absorbed $CO_2$ and be regenerated for reuse in the absorption column. The released $CO_2$ is collected for sequestration. The principles of chemistry are thus familiar.

The illustrated embodiment differs from prior art cylindrical columns in three ways in particular, which offer the potential for it to have optimized load bearing capability and facilitate its assembly in situ.

First, the column 21 in the embodiment is of a modular structure having plural vessel modules 25 in horizontal array with individual column modules housing the reactive volumes 27 and the outer shell 20 providing much of the structural support. This simplifies assembly and offers flexibility of size. This aspect of the modular structure can be seen in greater detail in FIGS. 5 and 6 and is discussed below.

Second, the vessel modules 25 are supported by a sling system (e.g., elongate tensile members) 12 slung from the roof 34. Additionally or alternatively tensile members may be slung from a support deck inside the roof. This support deck if then fixed to the vertical perimeter wall structure 22. In either case, the additional support structure transfers the load in a more stable way into and directly down through the vertical perimeter wall structure 22.

The sling system 12 is shown in greater detail in FIG. 3. It comprises a lug and plate beam 12a, slung rod with spade end 12b and inverted support angles 12c welded to the walls.

Third, the vessel modules 25 in the embodiment are assembled from multiple vertically arrayed baskets 28. These may be slung successively from the top down having been pre-fabricated off-site.

Figure 3A:
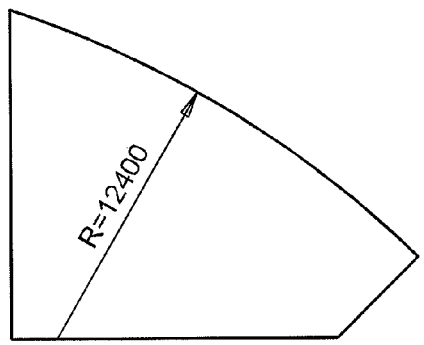
FIGS. 3a to 3c illustrate baskets for containing high surface area packing.
Figure 3A:
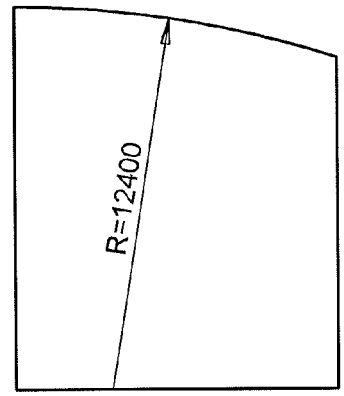
Figure 3A:
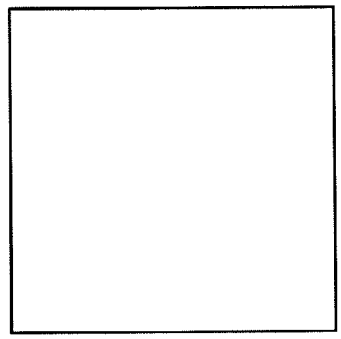
Figure 3B:
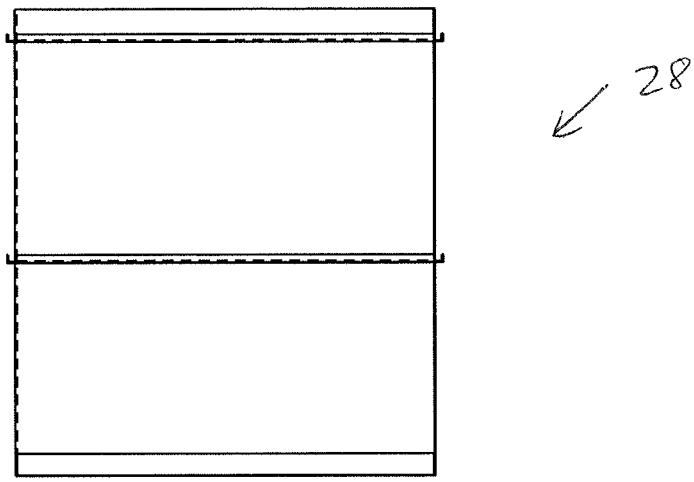
Figure 3C:
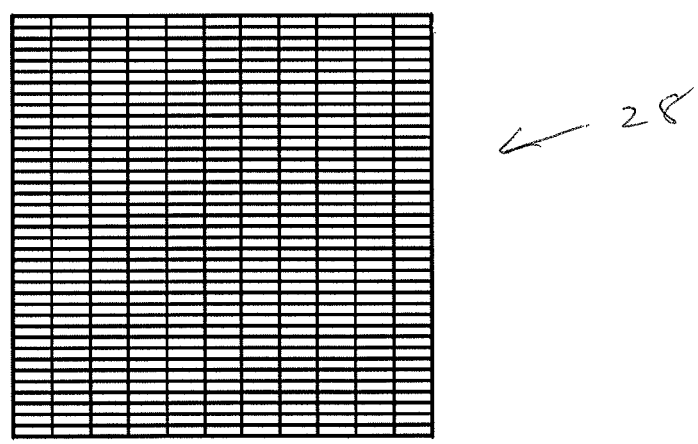

FIGS. 3a to 3c illustrate baskets 28 defining a containment means for a discrete portion of high surface area packing and carrying the same in the assembled column. FIG. 3a are horizontal cross-sections of baskets of each of the three column shapes illustrated in FIGS. 5 and 6 and respectively labelled thereon as type 1, type 2, type 3. FIG. 3b is a side wall of a basket in side elevation. FIG. 3c is a floor detail for the basket of square cross-section shape.

The modular structure of the embodiment is not a requirement of the invention but is a convenient mechanical arrangement by means of which the feature of the invention of providing secondary volume(s) fluidly isolated from the active volumes can be achieved.

The modular arrangement can be exploited in this way by fluidly isolating the volumes within the vessel modules 25 from secondary volume(s) 26 defined outside the vessel modules 25 but within the vertical perimeter wall 22. The insets in FIG. 1 illustrates how this is done by provision of a seal. The volumes within the vessel modules 25 comprise reactive volumes in which a mixture of gas and absorbent solution is supplied and absorption takes place. The volume outside the vessel modules 25 but within the vertical perimeter wall 22 is a fluidly separate secondary volume 26. This secondary volume need not have the harsh environment of the absorbent solution, but may instead be supplied with a dry relatively more inert atmosphere. This modular arrangement is an effective may of achieving this, but an arrangement which provides a similarly isolated single non-modular vessel defining a process volume can readily be envisaged.

In all such cases the vertical perimeter wall 22 may thus be designed for no liquid contact. It need not have the chemical resistance required of a wall of the process volume. It may be designed for its mechanical support role. This is achieved for example in the embodiment by means of the following:
all interconnecting welds between walls and baskets are seal welds;
all gaps between seal plates are eliminated;
all bolts and washers are seal welded to the walls;
the protective angle shown in the enlarged view in FIG. 1 is circumferentially continuous;

the absorber is pressurized prior to introduction of liquid into the modules.

The perimeter wall may then be constructed from material with its mechanical support role paramount. For example it may be concrete or carbon steel without any lining requirement.

The perimeter wall may additionally have structural modifications enhancing its mechanical support role. For example, in the embodiment, it carries the vessel modules via slung roof supports, and supports the suspension decks directly on the wall.

From a process control view point the outer enclosure is only required to provide a secondary fluid volume: (a) from ground up to the bottom of the module vessels where vessels must be sealed from gas leakage to the outside atmosphere; (b) from top seal where the "clean" gas is required to be vent to atmosphere. From a structural point of view the perimeter structure needs to transmit load from the point at which column structures are supported (for example, from the suspension deck) but need not form an enclosing perimeter for a secondary volume. Thus load may be transmitted to the ground by structural elements of the perimeter structure, which could be totally independent or integrated with the top and bottom enclosures above described. In the embodiment a single vertical perimeter wall structure 22 is provided in conjunction with suitable seals to perform both roles, but this is not a requirement of the invention.

A vessel module wall 15 may likewise be optimized for its role as a containment vessel for the process volume with the required chemical resistance but with reduced contribution to the carrying of the structural load. Larger and more flexible column structures can be made possible.

Figure 4:
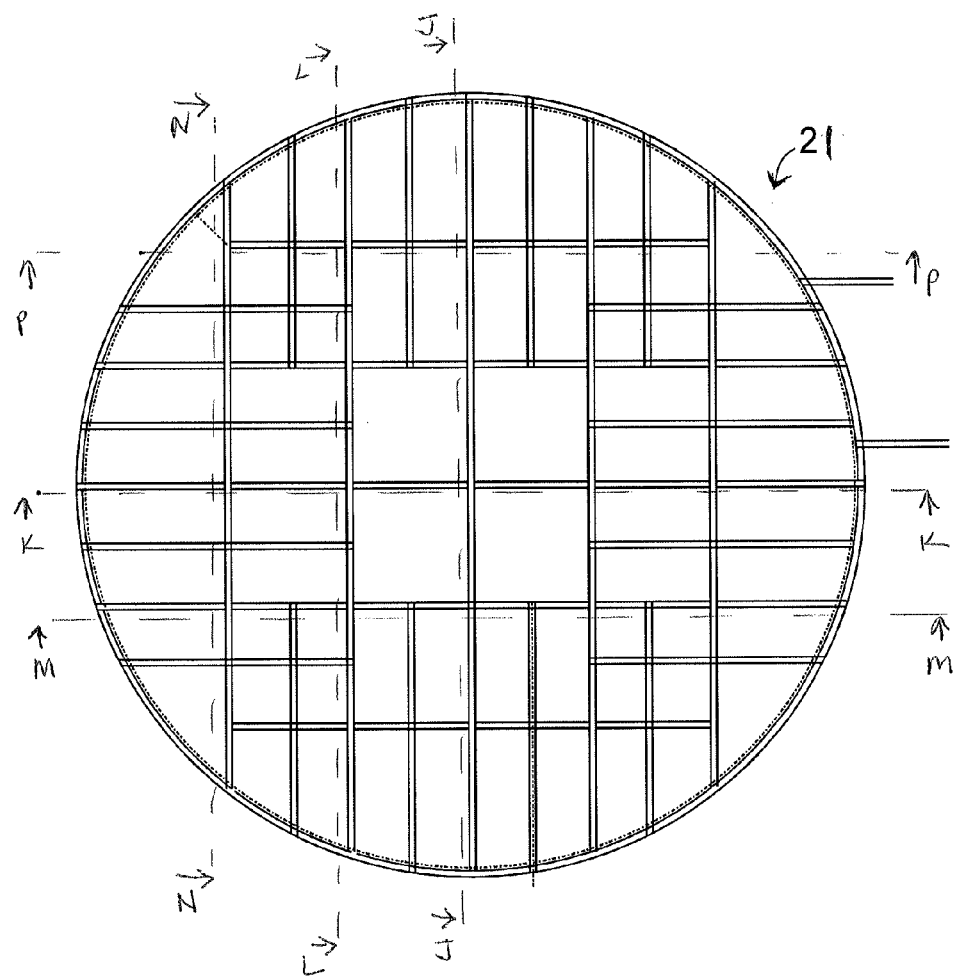
FIG. 4 illustrates in plan view a floor support framework for a platform level in the column structure of FIG. 1.

FIG. 4 illustrates in plan view a possible platform structure of the column 21.

Figure 4A:
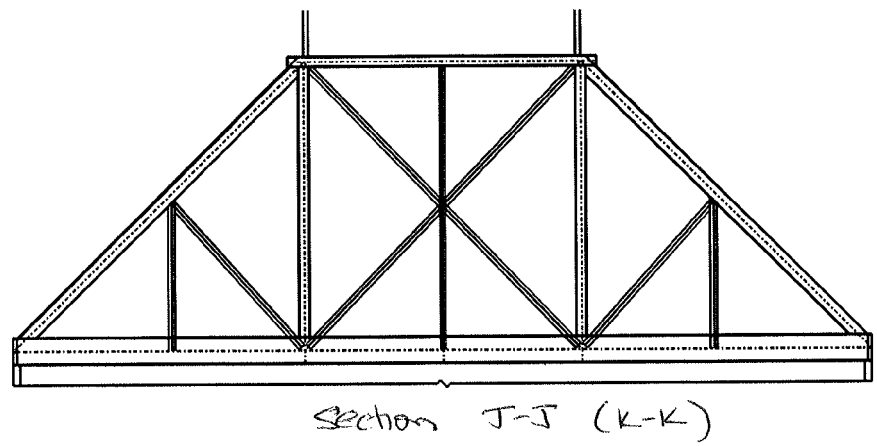
FIG. 4a illustrates sections through the possible suspension structure.
Figure 4A:
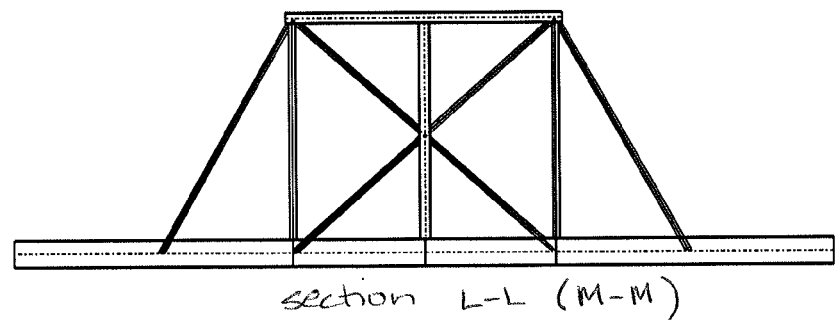
Figure 4A:
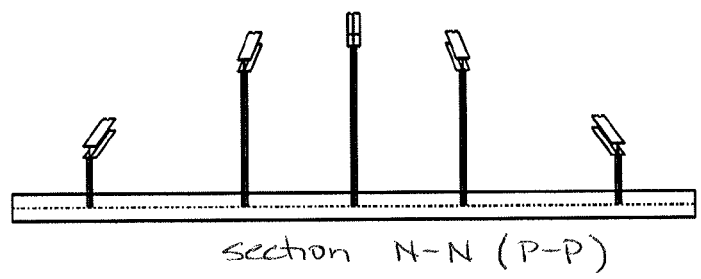

FIG. 4a illustrates sections through a possible platform suspension structure showing the suspension of the platform structure of FIG. 4 from the conical outer shell roof structure. Sections are shown from the top respectively through (as marked in FIG. 4) section J-J (K-K) is similar with members interconnected in between; section L-L (M-M) is similar with members interconnected in between and outer shell omitted; section N-N (P-P) is similar with members interconnected in between.

Figure 4B:
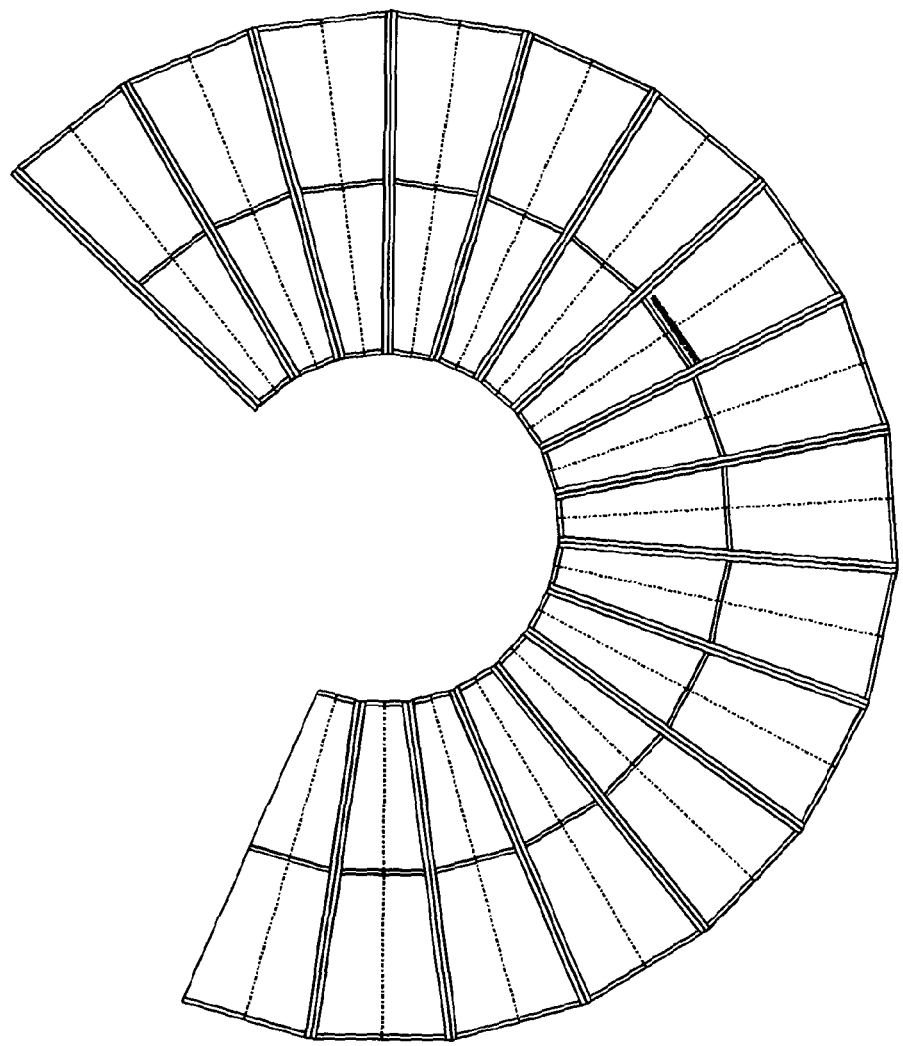
FIG. 4b shows a developed view from below of a suspension roof.

FIG. 4b shows a developed view from the underside of the top cone roof from which the platform structure of FIG. 4 is suspended.

A possible design of a typical absorbent liquid supply system is shown in plan view in FIG. 5. A common source pipe 41 feeds a manifold 43 in communication with a series of supply pipes 45 extending into the column at an appropriate absorbent liquid supply level. The supply pipes 45 are continuous and sealed around where they pass through the walls for example by a suitable washer. Outlets 47 are provided to supply each volume defined by each vessel module. The supply pipes 45 have progressively reducing diameter to facilitate even supply.

FIG. 5 also illustrates an example arrangement of and shapes of vessel modules. In FIG. 5 the modules define an inner zone in which vessel modules with planar walls and square transverse section are in a square 4×4 array and a perimeter zone in which each module has planar walls where adapted to sit in the assembled structure adjacent an inner zone module and curved walls adapted to sit in the assembled structure adjacent a correspondingly curved perimeter structure. The modules are assembled in tessellating manner such that the curved walls of the perimeter zone modules give a circular perimeter to the vessel assembly, which thus forms a cylindrical column.

It can be seen that this minimizes the range of vessel modules required. Each vessel module in the inner zone is identical (type 3a) and only four module designs respectively being mirror image pairs (type 1a, 1b and type 2a, 2b) are required in the perimeter zone. This simplifies the assembly process.

Figure 6:
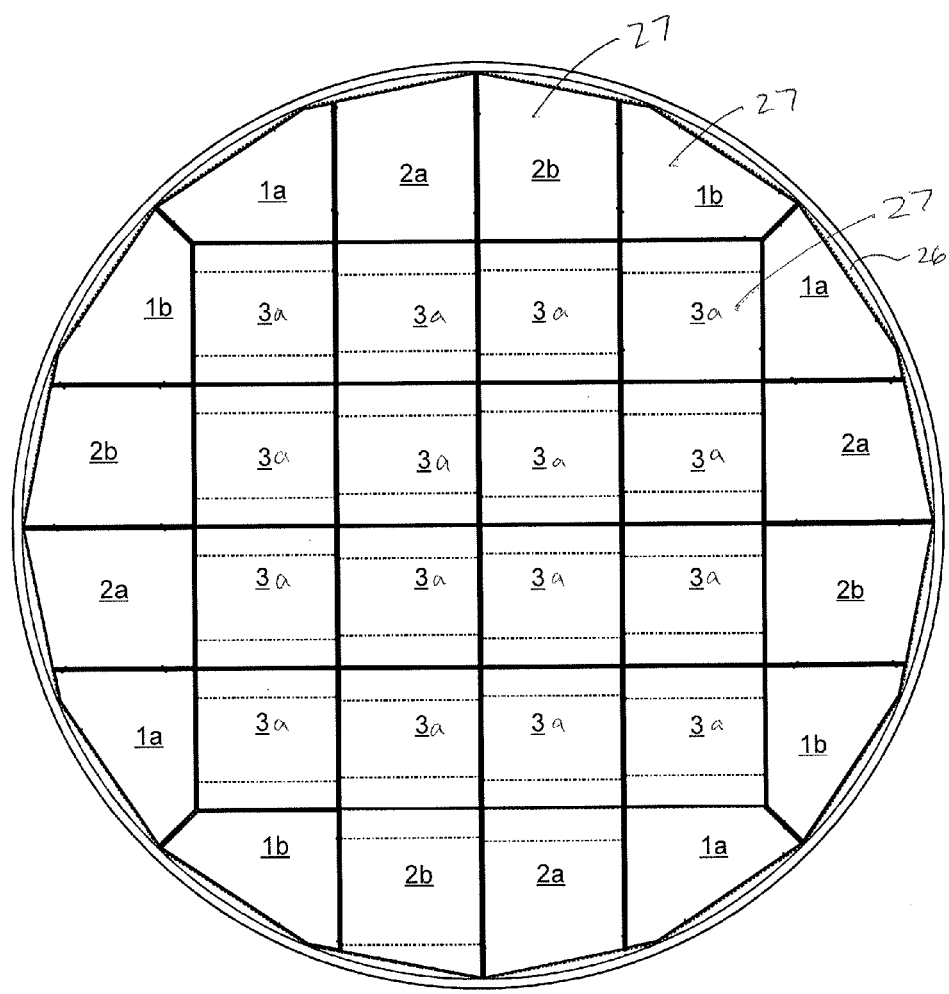
FIG. 6 illustrates in top plan view an alternative arrangement of modules.

FIG. 6 illustrates an alternative arrangement with alternative module design to produce a vessel assembly with a polygonal (in the example a regular hexadecagonal) perimeter. Again each vessel module in the inner zone is identical with square perimeter (type 3a). Again the perimeter zone modules are of four designs respectively being mirror image pairs (type 1a, 1b and type 2a, 2b), but in this case the perimeter zone modules are suitable shaped irregular polygonal prisms. The modules are assembled in tessellating manner to create the hexadecagonal vessel assembly.

The perimeter wall structure is in the example cylindrical, but may alternatively also be polygonal.

The invention claimed is:

1. A column structure for containment of packing material and absorbent liquid reagent for removal of a target gas from a gas stream comprising:
   at least one vessel module having an elongate upright wall structure to define and fluidly enclose an absorption process volume for the containment of the packing material and for a countercurrent flow of the absorbent liquid reagent and target gas in use;
   a column perimeter structure comprising an elongate upright wall structure having a continuous and closed perimeter disposed around the at least one vessel in such manner that an inner wall of the elongate upright wall structure of the column perimeter structure and an outer wall of the elongate upright wall structure of the at least one vessel module cooperably define and fluidly enclose at least one secondary fluid volume fluidly isolated from the absorption process volume;
   a supply pipe adapted to supply absorbent liquid reagent only into the process volume without being supplied into the at least one secondary fluid volume; and
   a gas inlet adapted to supply a gas to be processed into the process volume to flow counter-currently with the absorbent liquid reagent, and means to supply the gas to be processed into the secondary fluid volume without the absorbent liquid reagent, so as to create a less reactive atmosphere in the secondary fluid volume than in the process volume.

2. The column structure in accordance with claim 1 wherein the at least one vessel module is a plurality of vessel modules and wherein the secondary fluid volume additionally comprises space between outer walls of the elongate upright wall structures of adjacent vessel modules.

3. The column structure in accordance with claim 1 wherein the column perimeter structure is adapted to carry a major part of the structural load of the column structure.

4. The column structure in accordance with claim 1 wherein the vessel module perimeter comprises a closed simple polygon or closed simple curve or combination of the same.

5. The column structure in accordance with claim 1 wherein the continuous and closed perimeter of the elongate upright wall structure of the column perimeter structure defines a closed simple polygon or closed simple curve shape.

6. The column structure in accordance with claim 1 wherein the column perimeter structure additionally comprises a roof closure or partial closure, wherein the roof closure or partial closure defines a roof volume, and the roof closure or partial closure is adapted to contribute to a column load bearing capacity of the perimeter wall structure.

7. The column structure in accordance with claim 1 wherein the column perimeter structure is provided with:
   a top support structure extending inwardly from a perimeter of the vessel module to a top thereof; and
   tensile members attached to the top support structure and extending downwardly to support at least one of a transverse platform support structure for the packing material or the at least one vessel module.

8. The column structure in accordance with claim 1, wherein the elongate upright wall structure of the column perimeter structure has a polygonal perimeter shape, wherein an internal angle between each wall making up the polygonal perimeter is at least 120° and less than 180° and thus comprising a prismatic columnar structure.

9. The column structure in accordance with claim 1, wherein the column perimeter structure has a circular perimeter shape and thus comprising a cylindrical columnar structure.

10. The column structure in accordance with claim 1 wherein the at least one vessel module is a plurality of vessel modules each having an elongate upright wall structure defining a perimeter that surrounds the process volume, the vessel modules being disposed together alongside one another in two dimensional array to constitute collectively a vessel assembly.

11. The column structure in accordance with claim 10 wherein all walls that are entirely internal to the vessel assembly are planar.

12. The column structure in accordance with claim 10 wherein all of the vessel modules that are entirely internal to the vessel assembly have a square or rectangular perimeter shape.

13. The column structure in accordance with claim 10 wherein all of the vessel modules that are entirely internal to the vessel assembly are of identical shape and size.

14. The column structure in accordance with claim 10 wherein the outer walls of adjacent vessel modules extend substantially parallel to one another when the vessel modules are located in position for use.

15. The column structure in accordance with claim 14 wherein the outer walls of adjacent vessel modules are generally evenly spaced when the vessel modules are located in position for use.

16. A method of assembly of a column structure for containment of packing material and absorbent liquid reagent for the removal of a target gas from a gas stream, comprising:
   providing at least one vessel module having an elongate upright wall structure to define and fluidly enclose an absorption process volume for the containment of the packing material and for a countercurrent flow of the absorbent liquid reagent and target gas in use;
   providing a column perimeter structure comprising an elongate upright wall structure;
   surroundingly enclosing the at least one vessel module within the column perimeter structure of the column perimeter structure, in such assembled manner that an inner wall of the elongate upright wall structure of the column perimeter structure and an outer wall of the elongate upright wall structure of the at least one vessel module cooperably define and fluidly enclose at least one secondary fluid volume fluidly isolated from the absorption process volume;
   providing a supply pipe configured to supply absorbent liquid reagent only into the process volume without being supplied into the at least one secondary fluid volume; and
   providing a gas inlet configured to supply a gas to be processed into the process volume to flow counter-currently with the absorbent liquid reagent, and supplying the gas to be processed into the secondary fluid volume without the absorbent liquid reagent, so as to create a less reactive atmosphere in the secondary fluid volume than in the process volume.

17. The method in accordance with claim 16 further comprising providing fluid seals located in spaces between the inner wall of the elongate upright wall structure of the column perimeter structure and the outer wall of the elongate upright wall structure of the at least one vessel module to fluidly separate the process volumes in the at least one vessel module from the secondary volume external to the process volumes.

18. The method in accordance with claim 16, wherein the at least one vessel module is a plurality of vessel modules each having an elongate upright wall structure, and arranging the vessel modules together alongside one another in two dimensional array to constitute collectively a vessel assembly.

19. The method in accordance with claim 16 wherein the column perimeter structure and the at least one vessel module are so assembled that the column perimeter structure is adapted to carry a major part of the structural load of the column structure.

20. The method in accordance with claim 19 wherein the column perimeter structure is provided with:
   a top support structure extending inwardly from a perimeter of a vessel module to a top thereof; and
   tensile members attached to the top support structure and extending downwardly to support at least one of a transverse platform support structure for the packing material or the at least one vessel module.

21. The method of processing of a gas phase to effect separation of a component of the gas phase by absorption into a liquid phase comprises:
   providing a column in accordance with claim 1;
   providing the packing material in the column;
   causing the gas phase to flow through the process volume of the column;
   causing a liquid phase comprising the absorbent reagent to flow countercurrently through the process volume of the column without flowing through the secondary volume, so as to define a fluidly distinct active absorption volume within the process volume; and
   causing the gas phase to flow through the secondary volume without the absorbent reagent so as to create a less reactive atmosphere in the secondary volume than in the process volume.

22. The method in accordance with claim 21 wherein the gas phase is introduced towards a lower part of the column and caused to flow upwardly, and the liquid phase is introduced towards an upper part of the column and caused to flow downwardly.

23. The method in accordance with claim 21 wherein the at least one vessel module is assembled such that the secondary volume comprises a space between the outer wall of the elongate upright wall structure of the vessel module and the inner wall of the elongate upright wall structure of the column perimeter structure, and the liquid phase and gas phase to be processed are introduced to the at least one vessel module, and the relatively less reactive atmosphere is maintained within the space of the secondary volume.

24. The method in accordance with claim 23 wherein the gas is introduced to the secondary volume prior to introduction of the liquid phase to the process volume at a degree of overpressure to limit leakage of liquid phase into the secondary volume and to maintain a relatively less chemically reactive atmosphere in the secondary volume compared to the process volume.

* * * * *